Figure 1:
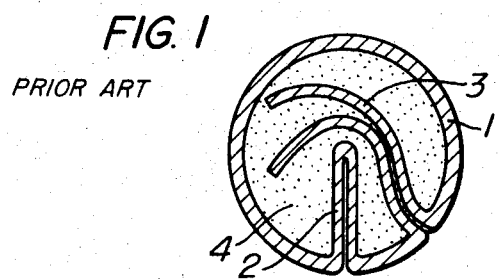

United States Patent

[11] 3,558,851

| | | | |
|---|---|---|---|
| [72] | Inventor | Takeshi Oku |
| | | Suita-shi, Japan |
| [21] | Appl. No. | 638,270 |
| [22] | Filed | May 15, 1967 |
| [45] | Patented | Jan. 26, 1971 |
| [73] | Assignee | Matsushita Electric Industrial Co., Ltd. |
| | | Osaka, Japan |
| | | a corporation of Japan |
| [32] | Priority | Jan. 23, 1967 |
| [33] | | Japan |
| [31] | | 42/5331 |

[54] SPECIAL WELDING ELECTRODES
1 Claim, 3 Drawing Figs.

[52] U.S. Cl. ..................... 219/146
[51] Int. Cl. ..................... B23k 35/22
[50] Field of Search ..................... 219/146;
148/24, 26; 117/202—206

[56] References Cited
UNITED STATES PATENTS

| 3,177,340 | 4/1915 | Danhier | 219/146 |
| 1,650,905 | 11/1927 | Mills | 219/146 |
| 3,184,577 | 5/1915 | Witherell | 219/146 |
| 3,211,883 | 10/1965 | Zimmermann | 219/146 |

Primary Examiner—J. V. Truhe
Assistant Examiner—Lawrence A. Rouse
Attorney—Stevens, Davis, Miller & Mosher ABSTRACT: Special welding electrode consisting of a composite wire and adapted for use in $CO_2$ shield gas arc welding, said welding electrode comprising a tubular outer casing of mild steel having a central hollow and a filler enclosed in said central hollow and composed of ferromanganese in an amount not less than 1.0 percent but not more than 2.2 percent based on manganese of the weight of the electrode, ferrosilicon in an amount not less than 0.3 percent but not more than 0.9 percent based on silicon of the weight of the electrode, ferroaluminum in an amount not less than 0.05 percent but not more than 0.8 percent based on aluminum of the weight of the electrode, an arc stabilizer consisting of a salt or oxide of alkali metal in an amount not less than 0.1 percent but not more than 3.0 percent of the weight of the electrode and the remainder of iron powder which may be added as required.

PATENTED JAN 26 1971

3,558,851

SPECIAL WELDING ELECTRODES

The present invention has for its object the provision of a special composite-type welding electrode adapted for use in consumable electrode shield gas arc welding primarily using such gas as $CO_2$, which is advantageous economically and excellent in both useability and weldability.

Various kinds of composite-type welding electrodes (hereinafter referred to as wire) have been proposed heretofore as electrodes for use in consumable electrode shield gas arc welding using such gas as $CO_2$. However, none of them is entirely satisfactory as will be described later.

The object of the present invention, therefore, is to provide a new composite-type wire to be used for welding in an atmosphere consisting primarily of $CO_2$ gas, which is free from the drawbacks of the conventional welding electrodes and which is simple in construction, excellent in useability and is advantageous economically.

Figure 2:
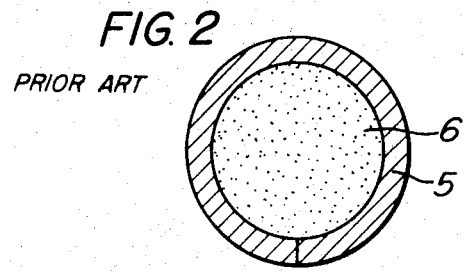
Figure 3:
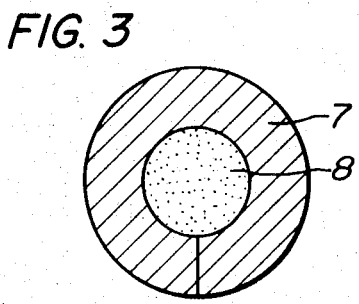

The present invention will be described in further detail hereunder in comparison with the conventional welding electrodes with reference to the accompanying drawings, in which:

FIGS. 1 and 2 are transverse cross sections of the conventional welding electrodes respectively; and FIG. 3 is a transverse cross section of the new welding electrode according to the present invention.

Referring to FIG. 1, there is shown in transverse cross section one representative form of the conventional composite-type wires, which is disclosed by Japanese Pat. No. 299057. This composite wire is composed of a metal casing 1 of, e.g. thin mild steel, interior fins 2 and 3 formed with parts of said metal casing and a filler 4 consisting of a mixed powder of a slag forming composition with deoxidizers, said slag forming composition being composed of such compounds as $TiO_2$, $MnO$, $SiO_2$, iron oxides, aluminas and alkalis. Moreover, according to this patent, it is described that the amount of the filler 4 must be within the range from 24 to 42 percent of the metallic portions 1, 2 and 3 in weight and further a total weight of the interior fins 2 and 3 must be greater than the weight of the casing 1.

In case of the composite wires of the structure wherein a filler composed of a slag forming composition and deoxidizers is packed interior of a metal casing, the amount of the slag forming composition must be larger than about 20 percent by weight in order for the bead resulting from welding to be covered uniformly with a sufficient amount of slag but an amount exceeding 40 percent will result in an unstable arc, as stated in said patent. Furthermore, the interior fins are of great significance for the metal casing and, because of the presence of said fins, it is possible to obtain a highly stable arc, to minimize the occurrence of spattering and to avoid such objectionable phenomenon as that wherein only the metal casing is molten at first during the welding operation, with the filler interior of the metal casing remaining unmelted and projecting from said metal casing. The composite wire of the type described, which contains a relatively large amount of slag forming composition in the filler, is capable of forming a bead having a beautiful appearance and a good shape, but, on the other hand, in order to improve the useability, it is necessary for the composite wire to have a structure as shown in FIG. 1. Such a composite wire, therefore, involves a number of problems in its manufacture and also is not economically advantageous. In addition, the composite wire of this type has the drawback that it is low in deposition efficiency, small in deposition rate and is not entirely satisfactory in weld penetration, due to the facts that it contains a large amount of filler and that high current density cannot be employed due to its diameter.

Another representative form of the conventional composite wires, which is disclosed by Japanese Pat. No. 288405, is shown in FIG. 2 in transverse cross section. The composite wire of this form comprises a tubular metal casing 5 formed mainly of a mild steel and a filler 6 enclosed therein consisting of a nonhydroscopic fluxing composition suitable for the formation of a hydrogen-free slag, deoxidizers, alloying elements and a metallic powder of the same composition as the metal casing.

The structure shown in FIG. 2 is not particularly new, but has been well known heretofore by being referred to as the Bernard method. It will be appreciated, therefore, that the characteristic features of this composite wire do not lie in its structure proper, but in restricting the composition of the filler to one consisting of a mixture of the nonmelted fluxing composition suitable for the formation of a flux, the deoxidizers and the metallic powder, which are all granulated and substantially nonhydroscopic containing substantially no hydrogen. More specifically, the specification of this patent specifies the use of calcium fluoride, mineral silicate, titanium oxide or calcium carbonate as the fluxing composition; ferromanganese, ferrosilicon and ferrotitanium as the deoxidizers; and iron powder or copper powder as the metallic powder, and illustrates a specific example of the filler consisting of a combination of said compounds. As compared with the composite wire of the structure shown in FIG. 1, the composite wire of this type is simple in structure but involves many problems in its useability and in the primary object of welding, that is, in obtaining excellent characteristics of the resultant weld. The specification of this patent emphasizes that the filler must be substantially nonhydroscopic and contains no hydrogen and this is solely for the purpose of obtaining a satisfactory weld.

The present invention contemplates to provide a composite wire adapted to be used for welding in an atmosphere consisting primarily of $CO_2$, which is simple in structure, excellent in useability and economically advantageous, as compared with the conventional welding electrodes described hereinabove. An embodiment of the inventive composite wire is shown in FIG. 3, in which it will be seen that the composite wire is composed of a metal casing 7 and a filler 8. The structure of the inventive composite wire is characterized by the following. Namely, 1. The composite wire is composed of a simple tubular casing and a filler filling the interior thereof.
2. The filler is composed of the following compounds:
   a. Ferromanganese in an amount of not less than 1 percent but not more than 2.2 percent, based on manganese, of the weight of the wire.
   b. Ferrosilicon in an amount of not less than 0.3 percent but not more than 0.9 percent, based on silicon, of the weight of the wire.
   c. Ferroaluminum in an amount of not less than 0.05 percent but not more than 0.8 percent, based on aluminum, of the weight of the wire.
   d. An oxide or salt of alkali metal or a combination thereof in an amount of not less than 0.1 percent but nor more than 3 percent of the weight of the wire.
   e. Iron powder which may be added as required to constitute the remainder of the filler.

As will be appreciated, the inventive feature of the present invention resides in the composition of the filler combined with a simple tubular structure. Such inventive feature of the invention will be described in further detail hereinafter.

A. Useability

The first problem relating to composite wire is its useability, particularly the occurrence of spattering. The present inventor has found the following facts with regard the spattering of the wires of this type as a result of observation of arcs by means of a fast motion picture and spatter trapping method.

A-1. A composite wire of the type containing a large amount of fluxing composition in the interior of a simple tubular casing causes irregular explosive spattering during arcing as a result of the filler protruding from the casing in a nonmolten state and being exposed to the heat of the arc. Additionally, the globule is large and does not transfer smoothly. This phenomenon may be minimized by employing the method disclosed by Japanese Pat. No. 299057.

A-2. Even with the welding electrode of simple tubular structure, the spattering may be reduced somewhat by not containing the fluxing composition in the filler and reducing the diameter of the casing to obtain a high current density. However, when only ferromanganese and ferrosilicon are used as the filler, an irregular local puncture phenomenon occurs intensely at the melting end of the wire during arcing, causing splashing of many fine spatters. This phenomenon cannot be alleviated even by the addition of an arc stabilizer, such as alkali metal salt. On the other hand, when a combination of ferromanganese, ferrosilicon and ferrotitanium is used as the filler, the spattering may be reduced as compared with the case of the preceding filler but the activity of the melting end of the wire is so violent that a further improvement is required.

A-3. The state of the arc changes drastically when ferroaluminum is added to the filler in a welding electrode of simple tubular structure consisting of ferromanganese and ferrosilicon. Namely, the intense puncture phenomenon at the melting end of the wire during arcing as has been experienced with the aforementioned Mn-Si-type or Mn-Si-Ti-type filler is substantially completely eliminated and the splashing of fine spatters is reduced drastically, rendering the arc stable. This is presumably because the addition of aluminum not only lowers the fluidity of the molten metal and increases the surface tension of said molten metal but also suppresses generation of CO gas, which is considered to be a major cause of the puncture phenomenon, by its strong deoxidizing action. In this case, it should be noted that addition of an extremely large amount of aluminum will result in excessive lowering of the fluidity, with the consequence that smooth detachment and transfer of the globule at the wire end becomes difficult and further the arc voltage rises making the arc unstable. However, by adding an arc stabilizer consisting of an alkali metal salt, e.g. sodium oxalate, it is possible to lower the arc voltage and to properly adjust the fluidity, and thereby to obtain a stable arc accompanying less spattering.

A-4. Iron powder is added for the purpose of increasing deposition rate but the spatter trapping experiment has proved that the addition of iron powder is also effective in reducing the spattering and stabilizing the arc.

B. Mechanical Properties of Weld

B-1. The mechanical properties of a weld obtained by the use of a composite wire having a Mn-Si-type or Mn-Si-Ti-type filler are generally satisfactory but a sufficiently high toughness cannot be expected in such weld. According to the experiments, the V-notch Charpy impact value of a completely welded metal was only within the range from 6 to 12 kg—m/cm.$^{68.}$ 0° C. and from 1.5 to 5 kg—m/cm.$^2$ at −20° C.

B-2. A weld obtained by the use of a composite wire having a Mn-Si-Al-type filler showed an excellent elongation and toughness. Namely, the V-notch Charpy impact value was within the range from 12 to 18 kg-m/cm.$^2$ at 0° C. and from 9 to 13 kg-m/cm.$^2$ at −20° C. In automatic welding, e.g. submerged arc welding, in the past, aluminum has not been positively used for the reason that it produces a large amount of fire-resistant substances in the weld metal which reduces the toughness of said metal. However, when the welding was conducted in a $CO_2$ atmosphere, only a very small amount of such substances was observed in the weld metal and the weld metal had an excellent elongation as will be described later, probably because of the difference in reaction rate. The present inventor has confirmed and reported previously that in $CO_2$ gas shield welding using a bare wire, the mechanical properties of a Mn-Si-Al-type weld are superior to that of the welds of the other type. In this case, however, the arc was unstable with the tendency of causing large size spatters because it is practically impossible to employ the composition of the filler according to the present invention.

C. Range of Ingredients

C-1. Ferromanganese and Ferrosilicon

These compounds are the ingredients which are basically influential in the strength and deoxidation of the resultant weld metal. Low carbon alloys should be used for both of these ingredients. The amount of ferromanganese to be incorporated is preferably not less than 1 percent but nor more than 2.2 percent, based on manganese, of the weight of the wire. An amount not more than 1 percent will result in an undesirably low strength of the weld metal, whereas an amount not less than 2.2 percent will result in an undesirably high strength of the same. The strength of the weld metal of course depends upon the amount of ferroaluminum added. With regard to ferrosilicon, a satisfactory result may be obtained in respect of ferrosilicon, a satisfactory result may be obtained in respect of the deoxidizing reaction when it is added in an amount of not less than 0.3 percent but not more than 0.9 percent, based on silicon, of the weight of the wire. In other words, the amount of ferrosilicon is preferably about 40 percent of that of manganese.

C-2. Ferroaluminum

Ferroaluminum acts as a strong deoxidizing ingredient as well as a fluidity adjusting ingredient. Experiments have revealed that addition of ferroaluminum in an amount of not more than 0.05 percent based on aluminum produces substantially no effect, while addition of the same in an amount not less than 0.8 percent based on aluminum makes the arc unstable resulting in deterioration of the weld. Therefore, ferroaluminum is added in an amount ranging from 0.05 to 0.80 percent inclusive, based on aluminum, of the weight of the wire.

C-3. Arc Stabilizer

Arc stabilizer serves to lower the arc voltage and adjust the fluidity of a molten metal, whereby the useability of the wire, which has been lowered by the addition of aluminum, is improved. A salt or oxide of alkali metal is used for this ingredient either alone or in combination. The amount of the stabilizer to be used is preferably within the range from 0.1 percent to 3 percent by weight. Addition of an excessive amount of the stabilizer is disadvantageous because the melting rate of the wire is lowered.

C-4. Iron Powder

This ingredient is added in an amount as required for the purpose of increasing the deposition rate. Advantageously, the amount of iron powder to be added is reduced to none or to a minimum by increasing the wall thickness of the tubular casing.

The present invention will now be illustrated by way of example.

A welding was conducted using a composite wire under the conditions set out below:

Wire:

| | | |
|---|---|---|
| Outer diameter of the wire | mm | 2.0 |
| Weight of mild steel tubular casing/total weight of wire | percent | 77 |
| Weight of filler/total weight of wire | do | 23 |
| Ferromanganese (Weight of Mn/total weight of wire) | do | 1.62 |
| Ferrosilicon (Weight of Si/total weight of wire) | do | 0.64 |
| Ferroaluminum (Weight of Al/total weight of wire) | do | 0.25 |
| Potassium oxalate (Weight of $Na_2C_2O_4$/total weight of wire) | do | 0.3 |
| Iron powder | | ($^1$) |

Welding conditions:

| | | |
|---|---|---|
| Current | 350A | DCRP |
| Voltage | | 31V |
| Rate | cm./min. | 40 |
| Flow rate of $CO_2$ | l/min. | 20 |

The mechanical properties of the weld obtained were as follows:

| | | |
|---|---|---|
| Tensile strength | kg./mm$^2$ | 48.7 |
| Yield point | kg./mm$^2$ | 41.5 |
| Elongation | percent | 33.2 |
| Reduction of area | do | 71.3 |
| $E_0$ (V-notch Charpy) | kg.-m./cm$^2$ | 15.3 |
| E-20 (V-notch Charpy) | kg.-m./cm$^2$ | 13.2 |

$^1$ Remainder of the filler.

During welding, the arc was stable with less spattering and the shape of the resultant bead was satisfactory. The ingredients constituting the filler are not restricted only to the ferroalloys depicted above but metals such as manganese, silicon, silico-manganese and, further, aluminum may be used. The wire is not necessarily of circular cross section but may also be of polygonal cross section. As has been described hereinabove in detail, the special welding electrode of the present invention has many industrial advantages, which are summarized as follows:

1. It is simple in construction and excellent in both useability and weldability.

2. Since the electrode can be provided in a small diameter to obtain a high current density, the deposition rate can be increased.

3. It produces substantially no slag as the wire contains no slag forming materials and therefore is suitably used multilayer welding.

4. It forms a beautiful bead although no substantial amount of slag is present, because the fluidity of the weld metal is adjusted.

I claim:

1. A consumable composite welding electrode adapted for use in arc welding in a shield of gaseous carbon dioxide, said welding electrode comprising a hollow outer casing of mild steel and a filler enclosed in said hollow outer casing, said filler being composed of ferromanganese in an amount not less than 1 percent but not more than 2.2 percent, based on manganese, of the weight of the electrode, ferrosilicon in an amount not less than 0.3 percent but not more than 0.9 percent, based on silicon, of the weight of the electrode, ferroaluminum in an amount not less than 0.05 percent but not more than 0.8 percent, based on aluminum, of the weight of the electrode, an arc stabilizer consisting of a salt or oxide of alkali metal in an amount of not less than 0.1 percent but not more than 3 percent of the weight of the electrode and the remainder of said electrode being metalic iron or alloy thereof.